Figure 1:
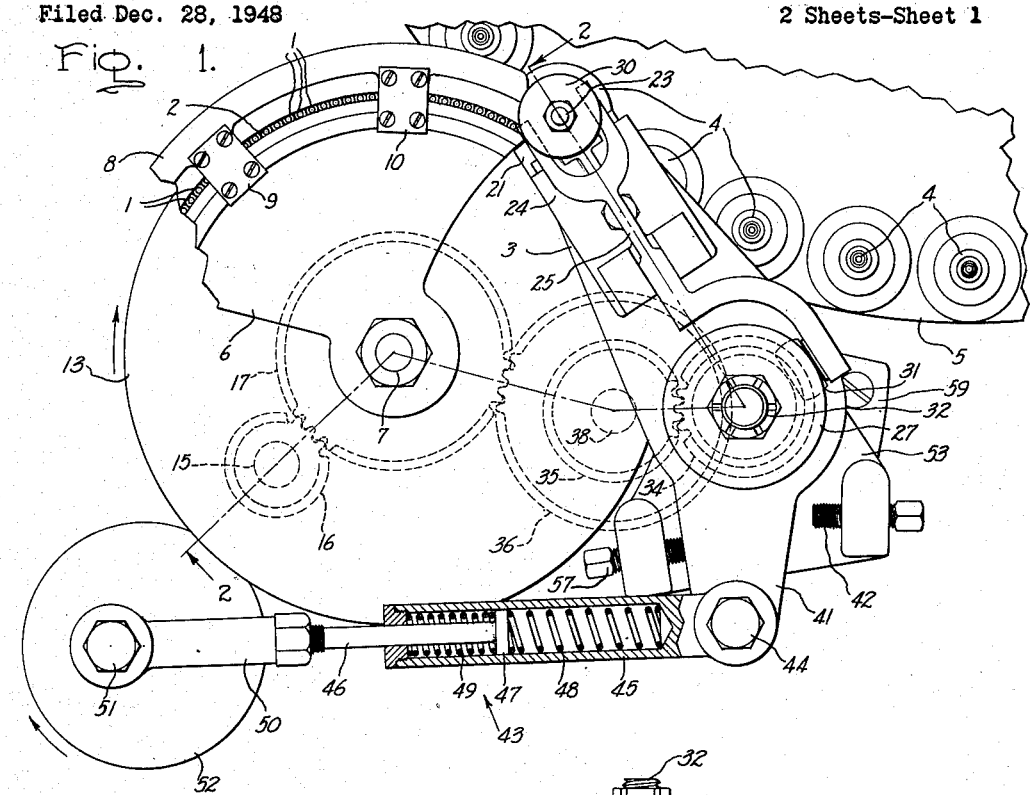

Aug. 15, 1950        J. A. AKEROYD        2,518,850

EYELET FEEDING MECHANISM

Filed Dec. 28, 1948                              2 Sheets-Sheet 1

Inventor:
Julius A. Akeroyd,
by Vernet C. Kauffman
His Attorney.

Aug. 15, 1950         J. A. AKEROYD         2,518,850
EYELET FEEDING MECHANISM
Filed Dec. 28, 1948                    2 Sheets-Sheet 2

Inventor:
Julius A. Akeroyd,
by Vernet C. Kauffman
His Attorney.

Patented Aug. 15, 1950

2,518,850

UNITED STATES PATENT OFFICE 2,518,850

EYELET FEEDING MECHANISM

Julius A. Akeroyd, East Greenwich, R. I., assignor to General Electric Company, a corporation of New York Application December 28, 1948, Serial No. 67,733

5 Claims. (Cl. 18—1)

My invention relates to apparatus for making lamp bases having apertured contact eyelets embedded in molded end-portions of insulating material. The invention has particular reference to an eyelet-feeding mechanism of the base-making apparatus and to the placement of the eyelet into the mold thereof.

Base-making apparatus is such that the molds in which the bases are assembled are, in a course of travel, momentarily presented at a station before an automatically actuated mechanism which inserts the base eyelet therein and such that subsequently occurring operations thereof provide for the addition of the metal shell and insulation elements of the base. The present invention is concerned only with the eyelet-feeding functions of the apparatus and particularly with the advancing of single eyelets from an in-line position to a proper central position in molds presented intermittently to one side thereof.

One object of the invention is to provide eyelet-feeding mechanism capable of advancing and positioning the relatively small metal eyelets of miniature bases in the molds of a base making machine. The feeding mechanism has an oscillatory cycle of operation arranging it in position to receive the end-most eyelet advanced along a feed channel and then repositioning it laterally over the mold of the base-making apparatus. Accurate placement of the eyelet is dependent to a great extent upon a guide pin inserted into an opening therein at the receiving position of the feeding mechanism and moved laterally therewith to the mold at the discharge position thereof. Further accuracy is achieved by preferably causing the end of the guide pin to enter an opening in the mold.

Another object of the invention is to provide a permanently aligned, reasonably wear-free and reliable eyelet-feeding mechanism, which mechanism is adapted to operate in such manner at the very high rates of speed desirable in base-making apparatus. The eyelet-feeding mechanism of this invention is also advantageous because of its simplicity of adjustment.

Still other objects and advantages of this invention will appear from the following description of a species thereof and from the drawing.

Figure 2:
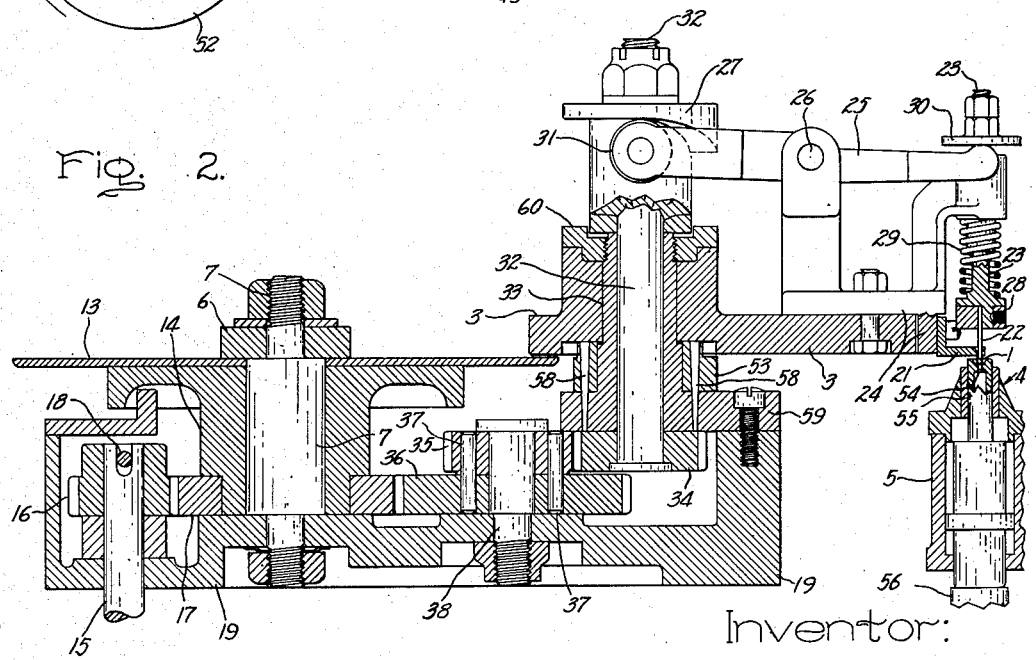
Figure 3:
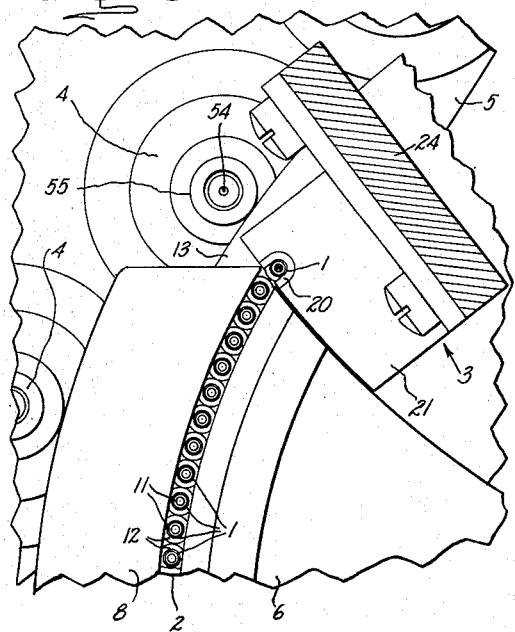
Figure 4:
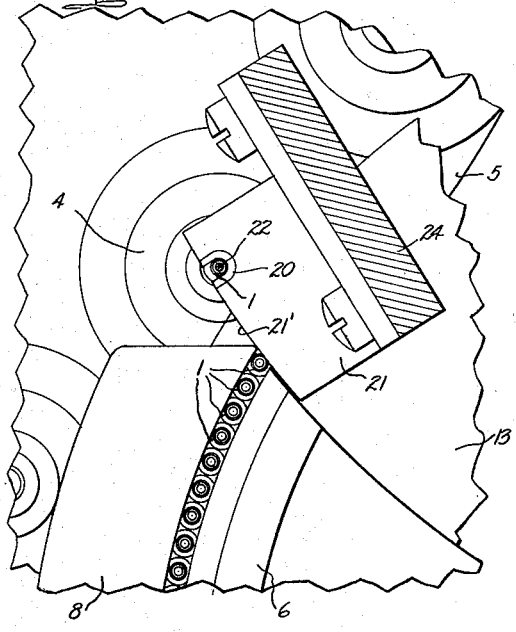

In the drawing, Fig. 1 is a plan view of an eyelet-feeding mechanism comprising my invention and an adjacent group of molds being advanced to and from operative relation thereto; Fig. 2 is an elevation of the eyelet-feeding mechanism largely represented by the section taken along the irregular dash-dot line 2—2 of Fig. 1 in the direction indicated; Figs. 3 and 4 are plan views, on a larger scale, of the eyelet supply channel, eyelet transfer shoe and the adjacent molds of the base-making machine at the receiving and delivery positions thereof respectively; and Figs. 5 and 6 are combination side and sectional views, taken from the arc of movement of the eyelet, of the end of the transfer shoe, the mold of the base-making machine and the guide pin, the elements being located at the receiving and the immediately following positions taken thereby.

The apparatus appearing in the drawing is designed to operate in combination with eyelet supply means, molds and driving means corresponding closely to that of the base-making apparatus appearing in United States Patent 1,210,237; Walker et al., dated December 26, 1916, and assigned to the assignee of the present invention. The eyelets 1 first appear in the present apparatus in the feed channel 2 of the supply means in a correspondingly orientated position and are, in the usual operations of said means, conducted by the channel 2 to the transfer arm 3 of my invention which provides for the placement of said eyelets 1 in the molds 4 of the base-making machine. In each cycle of operation of the apparatus, the transfer arm 3 moves a single eyelet 1 laterally from the end of the feed channel 2 to a specific position within a mold 4 momentarily arranged adjacent thereto and then returns to its original position. Between these operations of the transfer arm 3 the normal functions of the base-making machine index successive molds 4 on the turret 5 into operative relation to the transfer arm 3 so that successive molds 4 are in position to receive the eyelet 1 at the delivery position thereof in each cycle of operation.

Portions of the base-making apparatus disclosed in United States Patent 1,210,237 provide a constant supply of eyelets 1 completely filling the feed channel 2 which is formed by the fixed plate segment 6 attached to the post 7 and the arcuate plate segment 8 attached by means of the bridging plates 9 and 10 to said plate segment 6. The feed channel accommodates the upstanding hollow shank portion 11 of the eyelet 1 (as shown in greater detail in Figs. 3 and 5) and is of lesser width than the flared head portion 12 of the eyelet which rests on the smooth upper surface of a disk 13 fastened to a rotatable hub 14 (Fig. 2) on the fixed post 7. During all periods of operation of the apparatus the disk 13 is caused to rotate in a clockwise direction (Fig. 1) by means of a drive effected from the main operating means (not shown) of the base-making apparatus through the drive shaft 15, the gear 16 on said shaft 15 and the gear 17 on the hub 14. The frictional engagement of the heads 12 of the eyelets 1 with said disk 13 causes said eyelets to pass one after the other along the feed channel 2. A transverse key 18 (Fig. 2) extending through openings in the shank of the gear 16 and through a slot across the end of the shaft 15 causes these parts to rotate together, whereas, the frame 19 of the apparatus fixes the location of the shaft 15. Post 7 is also fixed in position by being mounted on said frame 19.

Figure 5:
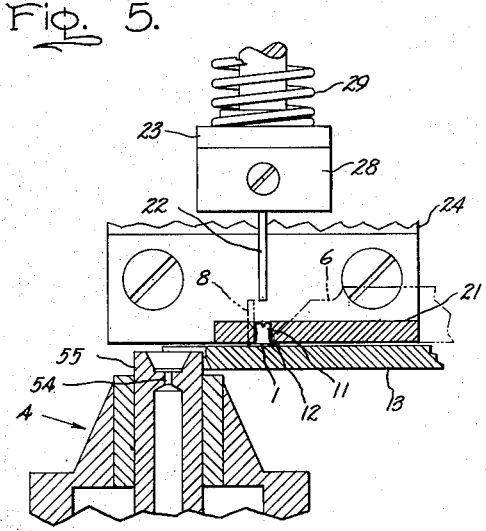
Figure 6:
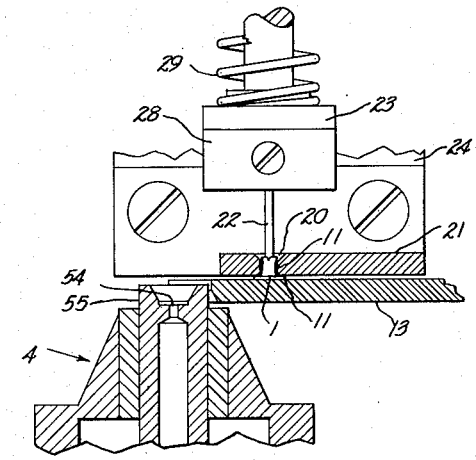

Referring to Figs. 3 and 5, at the moment of initiation of a cycle of operation of the eyelet feeding mechanism, the transfer arm 3 is located opposite the end of the feed channel 2, and the end-most eyelet 1 of those advanced through the feed channel 2 is contained within the pocket 20 of the shoe 21 attached to the end of the transfer arm 3. As the pocket 20 is only large enough to accommodate the end-most eyelet 1, the next succeeding eyelet 1 is being pushed thereagainst by movement of the disk 13 but remains trapped in the feed channel 2. With the advance of the cycle, the guide pin 22, which extends from a vertical push rod 23 retained by the bracket 24 (see also Fig. 2) at a position directly over said pocket 20, is caused to move down into the central opening in the eyelet 1 as shown in Fig. 6. This motion is brought about by a rocking of the operating lever 25 (Fig. 2) about the pin 26 supported by the bracket 24 and under the control of the cam 27. The guide pin 22, which is clamped to the push rod 23 by the collar 28, is mounted in a manner enabling it and the shoe 21 to be transferred as a single unit. To this end, the said shoe 21 is fastened directly to a depending lip of the bracket 24 and the push rod 23 is mounted for vertical movement in a portion of the bracket 24. The downward movement of the guide pin 23 brought about by the operating lever 25 is produced directly by the bias of the helical spring 29, which surrounds an end portion of the push rod 23 between the flanged lower end thereof and the bracket 24, and moves said push rod 23 downward only sufficiently to position the end of the guide pin 22 in close proximity to the disk 13. Control of the motion of the guide pin 23 continues to remain in the lever 25 which bears against the cap 30 on the upper end of the push rod 23, and is created by a difference in the thickness of the portion of the cam 27 engaged by the roller 31 on the end of said lever 25 adjacent thereto.

The motion of guide pin 23 is fixed in the cycle of operation in that said cam 27, which is rotated constantly, is driven by the main driving means of the base-making machine and is synchronized with the movements of the molds 4. The cam 27 is fastened to the vertical shaft 32 extending through the hollow pivot post 33, which functions as the center of the swinging motion of the transfer arm 3, and is rotated through the motion of said shaft 32, the train of gears 34 and 35, and the intermediate gear 36 the latter of which meshes with the driven gear 17. Pins 37, 37 joining gears 35 and 36 cause them to be rotated as a single unit about the supporting stud 38 which is fastened to the frame 19 of the apparatus.

The receiving position of the transfer arm 3 is fixed by the engagement of an extension 41 thereof (Fig. 1) with the stop screw 42 while under the counter-clockwise turning force of the connecting rod 43 attached to the projection 41 by bolt 44. The connecting rod 43, is comprised of the hollow head-end 45, an intermediate link 46 having a head portion 47 located between two helical compression springs 48 and 49 confined within the hollow head-end 45, and the crank end 50. The said rod 43 which is actuated by the crank pin 51 attached to the clockwise rotated disk 52 is moved an amount greater than that required to cause extension 41 to engage screw 42 which extends from an ear on the fixed collar 53 about the base of the pivot post 33. The continuing motion of the crank pin 51 in the presently described interval of the cycle of operation, which motion results because of the continuous rotation of the disk 52 throughout the cycle, is absorbed in the compression of the spring 48 by the link 46 of the connecting rod 43. The driving means for the crank disk 52 is the main driving means (not shown) of the base-making apparatus and turns said disk 52 in synchronism therewith one revolution during each cycle of operation.

Immediately after the guide pin 22 has been lowered into close proximity to the feed disk 13, a pivotal transferring movement occurs in the arm 3 which carries the shoe 21 and the eyelet 1 approximately radially outward of the disk 13 and over the mold 4 to the delivery position of the transfer arm 3 as shown in Fig. 4. Synchronized with the transferring motion is a further downward motion of the guide pin 22 after it has passed beyond the edge of disk 13 and which carries the lower end of the pin into the aperture 54 in the movable bottom portion 55 of the mold 4. This latter downward movement of the guide pin 22 prevents the eyelet 1 from slipping off the guide pin 22 before it is properly positioned within the mold 4 and provides means extending directly into said mold 4 for controlling the position of the eyelet 1. The downward movement of the guide pin 22 also assists the gravitational downward movement of the eyelet 1 making higher speeds of operation possible. The lateral and vertical motions of the various parts of the transferring mechanism together effect the rapid movement of the eyelet 1 over and into mold 4 and assure accurate placement thereof in a properly orientated position at a specific location in said mold 4. In the present showing it should be noted that the bottom 55 of the mold 4 is a movable portion thereof and is raised from the body of the mold 4 to close proximity to the level of disk 13 at the station opposite the eyelet feeding mechanism by the presence of cam 56 (Fig. 2) at said station. The apparatus is also of particular advantage in that it is capable of handling the very small base eyelets of minature bases, which are in the order of .15 inch in diameter and .10 inch in height at the very high speeds of base-making apparatus while preventing the eyelets 1 from being deposited in a tilted position as is sometimes the case in the use of prior apparatus.

The lateral transferring movement of the arm 3 from its pick-up position to its delivery position occurs as the crank pin 51 draws the connecting rod 43 to the left (Fig. 1) and effects a clockwise rotation of said arm 3 about the pivot post 33 carrying it against the stop screw 57 on the collar 53. The excess motion of the crank pin 51 in the present instance is taken up in compression of the spring 49 in said connecting rod 43. The collar 53 forms the support bearing for the transfer arm 3 and is fixed in position by the keying action of the taper pins 58, 58 which fasten it to the cover plate 59 over the adjacent portion of the frame 19. A bearing cap 60 threaded onto the upper end of the pivot post 33 prevents upward motion of the transfer arm 3 and completes the assembly.

The final lowering movement of the guide pin 22 is brought about by further rotation of the cam 27 bringing a thinner portion thereof into engagement with the roller 31 and completes the delivery functions of the transfer apparatus 1. During the lateral motion of the transfer arm 3 the supply of eyelets 1 in the feed channel 2 is prevented from escaping from the end thereof by the continuing presence of an arcuate face portion 21' (Fig. 4) of the shoe 21 across the end or mouth of said feed channel 2.

The return movement of the transfer arm 3 is comprised of an upward movement of the guide pin 22 carrying it out of the mold 4 and eyelet 1, and then a lateral movement of the arm 3 carrying it over into alignment with feed channel 2. The upward motion of the guide pin 22 is produced by a gradually thickening portion of the cam 27 coming into engagement with the roller 31 on operating lever 25, and the resulting upward movement of the push rod 23 against the expansion force of the spring 29. The lateral motion of the transfer arm 3, on the other hand, is produced by the rotation of the crank pin 51.

The above described cycle of operation of the eyelet-feeding mechanism automatically repeats itself at proper intervals and effects the feeding operation in the very short time interval between the regular indexing movements of the turret 5 which advance the molds 4 to and from the delivery position thereof. The index of the turret 5 occurs during the latter part of the return movement of the transfer arm 3 when all portions thereof are separated from the mold 4 and does not disturb the eyelet 1 which rests in an upright position in the depression or cavity in the movable bottom portion 55 of the mold 4.

What I claim as new and desire to secure by Letters Patent of the United States is:

1. Apparatus for feeding metal eyelets to a mold having an aperture therein comprising the combination of means for conducting a succession of eyelets to a receiving position adjacent the mold, transfer means arranged for horizontal movement between the receiving position and a discharge position over the mold and including a portion having a pocket therein for retaining an eyelet, said transfer means further including a guide pin in axial alignment with and above said pocket and means mounting said pin for longitudinal movement toward said pocket, means for moving said transfer means from said receiving position to said delivery position, and means for moving said pin into said pocket and into the eyelet therein while the transfer means is at said receiving position and for subsequently additionally moving said pin through said pocket and into the aperture in said mold when the transfer means is at its delivery position.

2. Apparatus for feeding metal eyelets to a mold having an aperture therein comprising the combination of means for conducting a succession of eyelets to a receiving position adjacent the mold and providing a horizontal support surface on which the eyelets rest and which extends into close proximity to the mold, transfer means arranged for movement between the receiving position and a discharge position over the mold and including an end portion provided with a notched pocket in an edge thereof for receiving an upstanding portion of an eyelet supported by said support surface, said transfer means further including a guide pin in axial alignment with and above said pocket and means mounting said pin for longitudinal movement toward said pocket, means for moving said transfer means from said receiving position to said delivery position, to carry the eyelet across and beyond the edge of the said support surface and over the mold, and means for moving said pin into said pocket and into the eyelet therein while the transfer means is at said receiving position and for subsequently additionally moving said pin through said pocket and into the aperture in said mold when the transfer means is at its delivery position.

3. Apparatus for feeding metal eyelets to a mold having an aperture therein comprising the combination of means forming a feed channel for conducting a succession of eyelets to a receiving position adjacent the mold, means providing a continuously advancing horizontal support surface located under the said channel and extending in close proximity to the mold for supporting the eyelets and advancing them through the channel to the receiving position, transfer means arranged for movement between the receiving position and a discharge position over the mold and including a shoe portion located closely adjacent said support surface and provided with a notched pocket in an edge thereof for receiving a portion of an eyelet advanced thereinto by said support surface, said transfer means further including a guide pin in axial alignment with and above said pocket and means mounting said pin for longitudinal movement toward said pocket, means for moving said transfer means from said receiving position to said delivery position, to carry the eyelet across and beyond the edge of the said support surface and over the mold and means for moving said pin into said pocket and into the eyelet therein while the transfer means is at said receiving position and for subsequently additionally moving said pin through said pocket and into the aperture in said mold when the transfer means is at its delivery position.

4. Apparatus for feeding metal eyelets to a mold having an aperture therein comprising means providing a horizontal support surface on which the eyelets rest and which extends between a receiving position adjacent the mold and a discharge position in close proximity to said mold, transfer means arranged for movement between the receiving and discharge positions and including an end portion provided with a notched pocket in an edge thereof for receiving an upstanding portion of an eyelet supported by said support surface, said transfer means further including a guide pin in axial alignment with and above said pocket and means mounting said pin for longitudinal movement toward said pocket, means for moving said transfer means from said receiving position to said delivery position, to carry the eyelet across and beyond the edge of the said support surface and over the mold, and means for moving said pin into said pocket and into the eyelet therein while the transfer means is at said receiving position and for subsequently additionally moving said pin through said pocket and into the aperture in said mold when the transfer means is at its delivery position.

5. Apparatus for feeding metal eyelets to a mold having an aperture therein comprising the combination of a continuously rotated disk located adjacent the mold for supporting and advancing an eyelet, transfer means comprising an arm mounted to pivot between a receiving position over the disk and a discharge position over the mold, said arm having a shoe portion closely adjacent the surface of said disk with a notched pocket in an edge thereof for receiving and retaining a portion of an eyelet advanced thereinto by said disk, a guide pin mounted on said arm in axial alignment with and above said pocket for longitudinal movement toward said pocket, means for moving said arm from said receiving position to said delivery position across the surface of said disk, and means for moving said pin into said pocket and into the eyelet therein while the transfer arm is at said receiving position and for subsequently additionally moving said pin through said pocket and into the aperture in the mold when the transfer arm is at its delivery position.

JULIUS A. AKEROYD.

REFERENCES CITED

The following references are of record in the file of this patent:

UNITED STATES PATENTS

| Number | Name | Date |
|---|---|---|
| 1,164,821 | Kingston | Dec. 21, 1915 |

FOREIGN PATENTS

| Number | Country | Date |
|---|---|---|
| 27,001 | Great Britain | of 1898 |